Patented Oct. 31, 1950

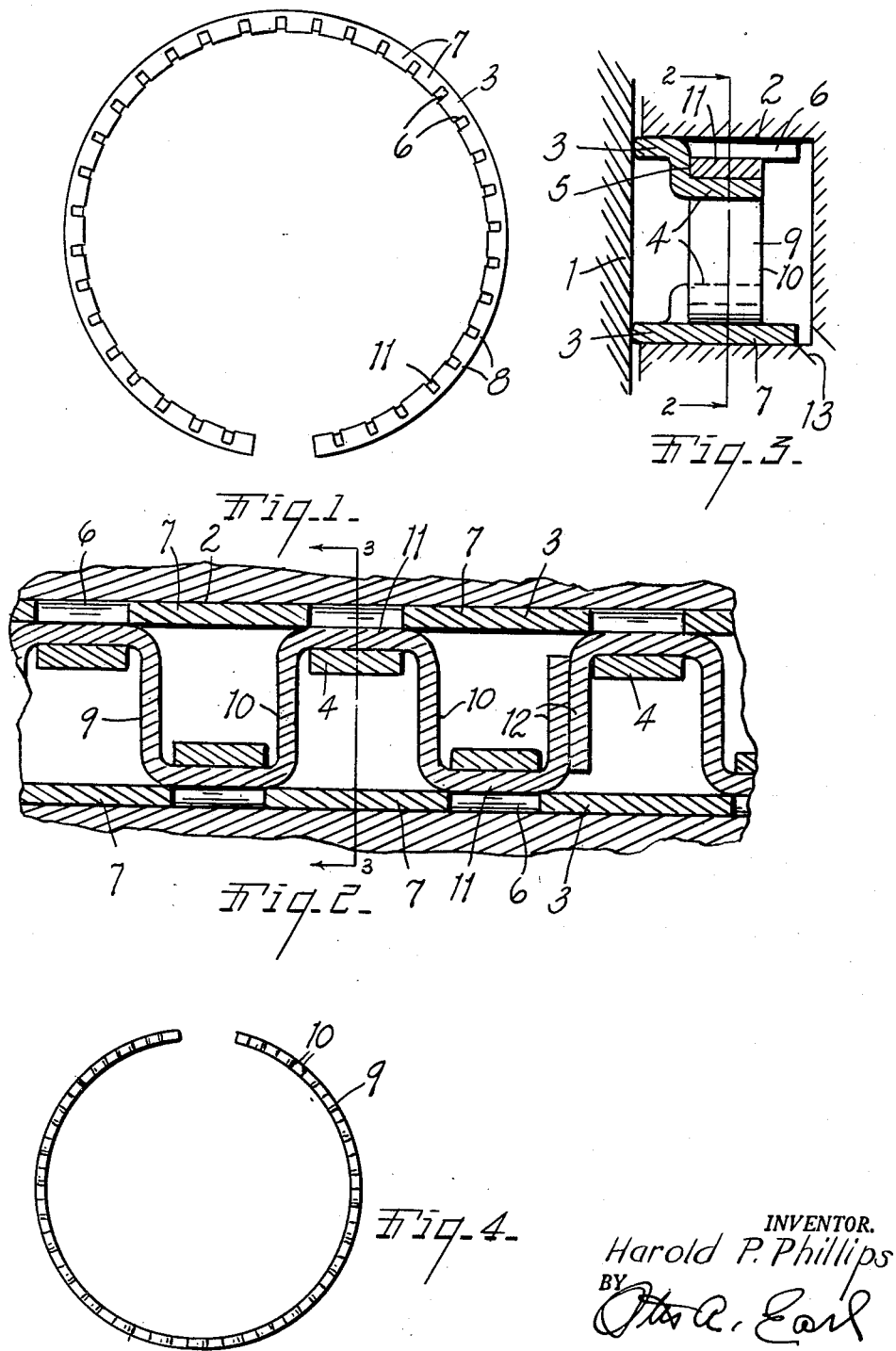

2,527,958

UNITED STATES PATENT OFFICE 2,527,958

PISTON RING ASSEMBLY

Harold P. Phillips, Hastings, Mich., assignor to Hastings Manufacturing Company, Hastings, Mich., a corporation of Michigan Application November 1, 1948, Serial No. 57,749

10 Claims. (Cl. 309—45)

This invention relates to piston ring assemblies.

The main objects of this invention are:

First, to provide a piston ring assembly in which the cylinder wall contacting elements and a combined spacer and expander element are all formed of ductile metal.

Second, to provide a piston ring assembly in which the cylinder wall engaging elements and the combined spacer and expander elements are retainingly assembled to be handled and installed as a unit.

Third, to provide a structure having these advantages which may be economically produced and very easily installed in a piston ring groove.

Fourth, to provide a cylinder wall connecting element formed of ductile metal consisting of a plurality of peripherally connected segments.

Fifth, to provide a combined expander and spacer element adapted for use with such assemblies.

Objects relating to details and economies of the invention will appear from the description to follow. The invention is defined and pointed out in the claims.

A preferred embodiment of the invention is illustrated in the accompanying drawing, in which:

Fig. 1 is a side elevational view of one of the cylinder wall engaging elements.

Fig. 2 is an enlarged fragmentary view in section on a line 2—2 of Fig. 3 of the ring assembly of my invention installed in a ring groove of a piston.

Fig. 3 is an enlarged fragmentary view on a line corresponding to line 3—3 of Fig. 2, the piston and the ring assembly being shown in relation to a cylinder wall.

Fig. 4 is a side elevational view of the combination expander and spacer element.

In the accompanying drawing no attempt has been made to show the parts in their relative proportion or their clearances and tolerances relative to the piston ring groove or of the cylinder and piston.

In the accompanying drawing, 1 represents the wall of a cylinder and 2 a piston ring groove having drain opening 13. The piston ring assembly of my invention comprises split resilient expansible wall elements 3, 3 preferably formed of ductile metal coiled edgewise and having annularly spaced tongues 4 struck inwardly therefrom providing inwardly facing abutments 5. The tongues are desirably arranged in a plane parallel to the plane of the ring element.

The slots 6 extend from the inner edges of the ring elements well toward their peripheries, providing a plurality of segments 7 connected by the portions 8 at the outer end of the slots. This results in a ring element that is relatively radially flexible, and at the same time has a continuous peripheral cylinder wall engaging edge portion.

These cylinder wall engaging elements are arranged with their tongues on their facing sides and in staggering relation.

The combined spacer and expander element designated generally by the numeral 9 is desirably formed of ductile metal such, for example, as ribbon steel coiled edgewise and transversely corrugated or sinuously bent to provide a series of connected zigzags 10. The bights 11 of these bends are desirably substantially straight as shown in the drawing. The bights are engaged under the tongues in thrust engagement with the abutments 5 and in thrust engagement with the sides of the cylinder wall engaging members.

In the preferred embodiment as shown in Fig. 2, the ends 12 of the member 9 are in thrust sustaining engagement with the member 9 under compressing stress so that it resiliently urges the cylinder wall engaging elements radially outward against the cylinder wall. The parts being formed of ductile metal are not likely to breakage and may be readily produced. When the cylinder wall engaging elements are formed as in the embodiment illustrated, they are relatively flexible and at the same time have a continuous sealing edge presented to the cylinder wall.

It is desired to point out that the combination expander and spacer elements may be of such springability or resilience that it is not necessary for the ends to abut when they are installed as shown in Fig. 2, in order to secure the desired expansion stresses.

I have illustrated and described my improvements in an embodiment which I have found highly practical. I have not attempted to illustrate or describe other modifications or adaptations which I contemplate, as I believe this disclosure will enable those skilled in the art to embody or adapt my invention as may be desired.

Having thus described my invention, what I claim as new and desire to secure by Letters Patent is:

1. A piston ring assembly comprising split resilient cylinder wall engaging elements formed of ductile metal coiled edgewise and having angularly spaced tongues laterally offset therefrom, the elements being arranged in axially spaced relation with their tongues on their facing sides, and an intermediate split resilient expansible combined spacer and expander member formed of a strip of ductile metal of substantial width corrugated sidewise and arranged radially edgewise between the cylinder wall engaging elements with alternating bights of the corrugations thereof engaged under the tongues of the ring elements and in radial springable thrust engagement therewith, the bights being flattened and of a length permitting limited relative sliding movement of the engaged parts and the ends of the intermediate member being in end thrust sustaining engagement.

2. A piston ring assembly comprising axially spaced annular split expansible cylinder wall engaging elements formed of ductile metal coiled edgewise and each having a plurality of angularly spaced angular tongues struck from their inner edges and laterally offset therefrom providing inwardly facing angular abutments, the ring elements being arranged with their tongues on their facing sides and in staggered relation, and a sinuously bent intermediate element disposed with alternating bends thereof engaged with alternating tongues of the cylinder wall engaging elements, the ends of the intermediate members being in thrust engagement when the ring elements are compressed within a cylinder wall.

3. A piston ring assembly comprising split resilient expansible cylinder wall engaging elements formed of ductile metal coiled edgewise and having angularly spaced inwardly facing angular tongues offset therefrom, the elements being arranged in axially spaced relation with their tongues on their facing sides and in staggered relation, and a split resilient radially expansible axially corrugated combined spacer and expander member disposed between the cylinder wall engaging elements with alternating bights thereof engaged within the tongues of the ring elements and in radial springable thrust engagement therewith, the ends of the said member being in thrust engagement when installed.

4. A piston ring assembly comprising split resilient cylinder wall engaging elements having angularly spaced laterally offset hook-like tongues conformed to provide inwardly facing abutments, the ring elements being arranged with their tongues on their facing sides, and a split resilient sinuously bent intermediate member disposed with the bights of alternating bends thereof within and in radial thrust engagement with the tongues of the cylinder wall engaging elements when the assembly is contractingly installed, and the ends thereof in thrust sustaining engagement.

5. A piston ring assembly comprising axially spaced annular split resilient cylinder wall engaging elements formed of ductile metal coiled edgewise and each having a plurality of angularly spaced angular tongues struck from their inner edges and laterally offset therefrom providing inwardly facing angular abutments, the ring elements being arranged with their tongues on their facing sides and in staggered relation, and a uniformly corrugated split expansible resilient combined spacer and expander element formed of ribbon ductile metal corrugated sidewise and disposed radially edgewise with alternating corrugations thereof engaged within alternating tongues of the cylinder wall engaging elements and in sliding thrust engagement with the abutments thereof.

6. A piston ring assembly comprising a split expansible axially spaced wall engaging ring element, each having angularly spaced angular tongues struck therefrom and laterally offset from the plane thereof and constituting inwardly facing abutments, the ring elements being disposed with their tongues on their facing sides and in staggered relation, and a split resilient sinuously bent intermediate element disposed with alternating bends thereof within and in sliding thrust engagement with said tongues.

7. A piston ring assembly comprising resilient axially spaced cylinder wall engaging elements having laterally projecting angularly spaced angular abutments, the ring elements being arranged with their abutments on their facing sides and a corrugated intermediate member disposed between said cylinder wall engaging members with the bights of alternating corrugations within and in sliding engagement with the said abutment members of said cylinder wall engaging elements.

8. A piston ring assembly comprising split resilient axially spaced cylinder wall engaging elements having angularly spaced laterally offset integral tongues disposed in a plane substantially parallel to the plane of the element by which they are carried, the ring elements being arranged with their tongues on their facing sides, and a split resilient sinuously bent intermediate element having bights thereof engaged within said tongues on the cylinder wall engaging elements.

9. A piston ring assembly comprising split resilient cylinder wall engaging elements having angularly spaced inwardly facing hooked abutments, the ring elements being arranged with their abutments on their facing sides, and a split resilient zigzag intermediate member disposed between the cylinder wall elements with the bights of alternating bends thereof within and in radial thrust engagement with the hooked abutments thereof.

10. A piston ring assembly comprising a split expansible axially spaced wall engaging ring element, each having angularly spaced inwardly facing angular abutments laterally struck therefrom and spaced from their outer and inner edges, the ring elements being disposed with their abutments on their facing sides, and a split resilient sinuously bent intermediate element disposed with bights of the bends thereof within and in radial thrust engagement with said abutments and in axial thrust sustaining engagement with the sides of the elements.

HAROLD P. PHILLIPS.

REFERENCES CITED

The following references are of record in the file of this patent:

UNITED STATES PATENTS

| Number | Name | Date |
| --- | --- | --- |
| 2,229,578 | Malpas | Jan. 21, 1941 |
| 2,369,263 | Teetor | Feb. 13, 1945 |

FOREIGN PATENTS

| Number | Country | Date |
| --- | --- | --- |
| 5,498 | Great Britain | of 1881 |
| 3,358 | Great Britain | of 1883 |
| 6,013 | Great Britain | of 1897 |
| 555,348 | Great Britain | Aug. 18, 1943 |